United States Patent
Corrado et al.

[11] Patent Number: 5,280,703
[45] Date of Patent: Jan. 25, 1994

[54] TURBINE NOZZLE COOLING

[75] Inventors: John Corrado; Nipulkumar Shah, both of San Diego, Calif.

[73] Assignee: Sundstrand Corporation, Rockford, Ill.

[21] Appl. No.: 448,259

[22] Filed: Dec. 11, 1989

[51] Int. Cl.$^5$ .............................................. F02G 1/00
[52] U.S. Cl. .................................................. 60/39.36
[58] Field of Search ................... 60/39.36, 752, 760, 60/39.75

[56] References Cited

U.S. PATENT DOCUMENTS

| | | | |
|---|---|---|---|
| 2,709,893 | 6/1955 | Birmann | 60/39.75 |
| 2,924,937 | 2/1960 | Leibach | 60/39.36 |
| 3,304,713 | 2/1967 | Sydlowski | 60/39.36 |
| 3,316,714 | 5/1967 | Smith et al. | 60/39.36 |
| 3,623,318 | 11/1971 | Shank | 60/39.36 |
| 3,797,236 | 3/1974 | Hooke et al. | 60/39.36 |
| 4,173,120 | 11/1979 | Grosjean et al. | 60/39.161 |

FOREIGN PATENT DOCUMENTS

88/04722 6/1988 World Int. Prop. O. ......... 60/39.36

Primary Examiner—Richard A. Bertsch
Assistant Examiner—T. Thorpe
Attorney, Agent, or Firm—Wood, Phillips, VanSanten, Hoffman & Ertel

[57] ABSTRACT

Difficulties in cooling the vanes or blades (46) making up a turbine nozzle (40) in a gas turbine may be minimized or eliminated by placing interior passages (62) of the blades or vanes (46) in fluid communication with the compressor (14) and providing outlet passages (64) for the passages (62) in the rear turbine shroud (42). The passages (64) are preferably angled so that their downstream ends (68) open downstream. Consequently, eductor or ejector-like formations are present and when cooling air for a combustor (30) flowing in a cooling air path (28) passes across the ends (68), a region of lower pressure is formed to positively assure the flow of cooling air through the vanes or blades (46).

12 Claims, 1 Drawing Sheet

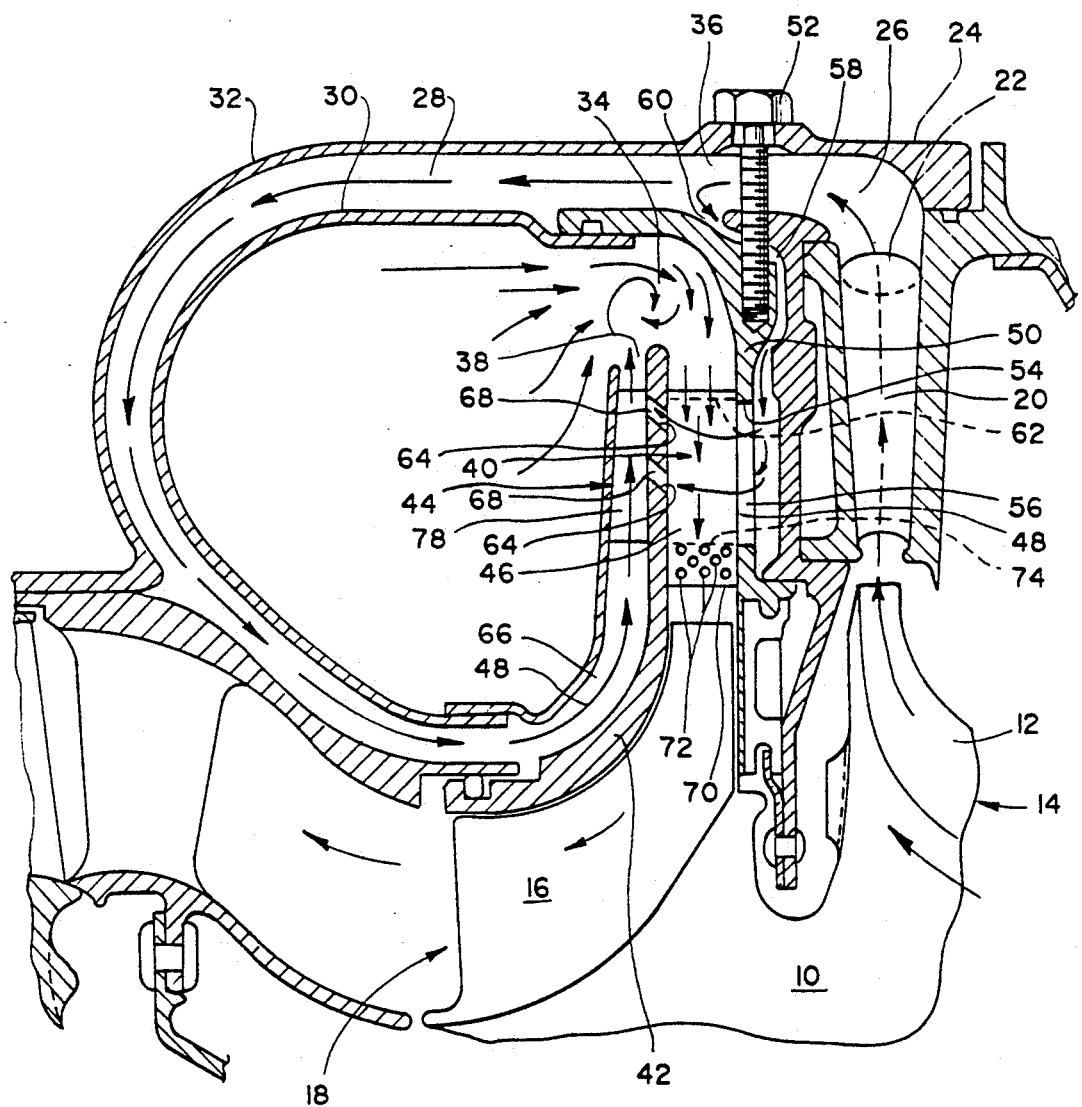

TURBINE NOZZLE COOLING

FIELD OF THE INVENTION

This invention relates to gas turbines, and more particularly, to improvements in the cooling of turbine nozzles.

BACKGROUND OF THE INVENTION

As is well known components if gas turbine engines exposed to hot gases of combustion cannot stand prolonged exposure to unusually high operating temperatures or else they suffer premature failure due to thermal fatigue, thermal stresses and the like. While the upper temperature limit to which such components may be exposed can be increased by resort to exotic materials, this solution is not popular because of the increased cost associated therewith.

Consequently, most efforts directed towards preventing exposure of such components to undesirably high temperatures have fallen in one or both of two general categories. Those categories include the addition of so-called dilution air to the hot gases of combustion before they are applied to the turbine nozzle and turbine wheel. The dilution air brings down the temperature of the hot gases of combustion to a value at which the turbine components can readily operate. To be effective, this solution requires good mixing of the dilution air with the hot gases of combustion or else hot spots will exist; and such hot spots and the resulting temperature gradients induce thermal stresses.

Another approach to solving the problem involves the cooling of the components that are exposed to the hot gases of combustion so that they themselves do not operate at excessive temperatures.

One component of a turbine engine requiring protection from hot gases of combustion is the turbine nozzle. The nozzle has which receive the hot gases of combustion from the turbine engine combustor and directs the same against the blades on a turbine wheel to drive the same. Typically, dilution air is introduced into the following stream of gases upstream of the turbine nozzle and, not infrequently, some provision is made for flowing cooling air, usually taken from the compressor of the engine, through the individual vanes or blades making up the turbine nozzle to provide both convective and conductive cooling of the vanes. In the typical case, the vanes are provided with outlet openings on their respective surfaces either simply to allow the flow of cooling air to exit into the gas stream, or in many cases, to provide film air cooling on the exterior of the vanes. The holes or apertures used are typically quite small and the formation of the same is costly. Nonetheless, cooling of nozzle vanes by flowing air through the interior thereof for cooling purposes has proven to be effective.

The present invention is directed to providing a less costly, yet highly effective, means of promoting the cooling of nozzle vanes in a gas turbine engine.

SUMMARY OF THE INVENTION

It is the principal object of the invention to provide a new and improved gas turbine engine More particularly, it is an object of the invention to provide a gas turbine engine with effective, inexpensive means for cooling the turbine nozzle.

An exemplary embodiment of the invention achieves the foregoing object in a gas turbine including a rotary compressor, a turbine wheel coupled to the compressor, and a nozzle including a plurality of vanes for directing gases of combustion at the turbine wheel to drive the same. The engine includes an annular combustor having an outlet connected to the nozzle and adapted to receive fuel and an oxidant therefor to provide the gases of combustion. A rear turbine shroud is provided proximate to the turbine wheel and means define a combustor cooling air path about the combustor. The combustor cooling air path has an inlet connected to the compressor and an outlet along the rear shroud. Means are provided which include passages that extend through the vanes, and which are connected to the compressor to define a nozzle cooling air path through the varies to an outlet in the rear shroud. Means are associated with the vane cooling air path for creating a relatively lower pressure area at the rear shroud outlet to promote the flowing of cooling air through the vane cooling air path.

As a result of the foregoing construction, the number of apertures to the exterior of the nozzle vane surface may be minimized or such apertures may be eliminated together. At the same time, adequate air flow through the vanes to assure good cooling is provided through the use of the means that create the relatively lower pressure area.

In a preferred embodiment, the lower pressure creating means includes an eductor means operated in response to the flow of cooling air along the combustor cooling air path.

The invention comprehends that the eductor means comprise eductor formations in the rear shroud. Typically, such formations may each comprise at least one passage in the rear shroud connected to both the cooling air paths and angled in the downstream direction at its point of connection to the combustion cooling air path.

A highly preferred embodiment of the invention contemplates that each such point of connection be at a location on the combustor cooling air path between the combustor and the rear shroud.

In a preferred embodiment, swirler vanes are located between the combustor and the rear shroud at the point of connection.

In the usual case, the means defining the cooling air path include a combustor case that surrounds the combustor in spaced relation thereto and has an upstream inlet connected to the compressor and a downstream outlet adjacent to the nozzle and the combustor outlet.

Preferably, the turbine wheel is a radial turbine wheel and the nozzle surrounds the turbine wheel.

Other objects and advantages will become apparent from the following specification taken in connection with the accompanying drawings.

DESCRIPTION OF THE DRAWING

The Fig. is a fragmentary, sectional view of a gas turbine engine made according to the invention.

DESCRIPTION OF THE PREFERRED EMBODIMENT

An exemplary embodiment of a gas turbine engine made according to the invention is illustrated in the drawing and with reference thereto is seen to include a so-called monorotor hub 10. The hub 10, on one side, mounts blades 12 defining a compressor section, generally designated 14. On the opposite side, turbine blades 16 are provided to define a turbine wheel section, generally designated 18. It is, however, to be expressly understood that the invention is not limited to gas turbine engines employing monorotors but may be employed with efficacy in any of a variety of other constructions wherein one or more stages of a compressor are coupled to one or more stages of a turbine.

The compressor 14 discharges into a conventional diffuser 20 which converts velocity head into static pressure head as is well known. At the outlet 22 of the diffuser 20, a housing element 24 provides an elbow passage 26 which extends to a combustor cooling air path 28. The combustor cooling air path 28 is defined by the wall 30 of an annular combustor which may be of conventional configuration and a conventional surrounding combustor case 32. The combustor case 32 is, of course, spaced from the combustor wall 30 both on its radially inner and radially outer sides as well as being axially spaced on a side thereof (not shown) remote from the combustor outlet shown at 34. Thus, the cooling air path 28 extends about the entirety of the combustor 30.

The combustor case 32 has an inlet area 36 immediately downstream of the elbow 26 as well as an outlet area 38 immediately adjacent the outlet 34 and an annular turbine nozzle 40 to be described in greater detail hereinafter.

The turbine section 18 includes a rear turbine shroud 42 which is in close proximity to the blades 18 and which may be considered as forming a continuation of the combustor case 32. The rear shroud 42 extends upwardly into adjacency with and in supporting relationship to the nozzle 40. Specifically, sides 44 of individual vanes or blades 46 making up the nozzle 40 are secured in a conventional fashion to the rear turbine shroud 42. The opposite sides 48 of the blades or vanes 46 are secured in conventional fashion to a front turbine shroud 50 which may be held in place by bolts 52 secured through the case 32, also in a manner well known.

According to the invention, the front turbine shroud 50, in alignment with each of the blades or vanes 46, includes openings 54. On the side of the openings 54 opposite from the blades or vanes 46 is a space 56 which, by means of a channel 58, is in fluid communication with the compressor 14. The channel 58 includes an inlet 60 generally in the area of the case inlet 36.

As a consequence of the foregoing, compressed air from the compressor 12 and taken downstream of the diffuser 20 may be directed to the openings 54 and the front shroud 50.

Each of the blades or vanes 46 include one or more interior passages 62. At least one such passage 62 extends completely across each blade or vane 46 to be in fluid communication with one or more passages 64 in the rear shroud 42. The passages 64 are angled in the downstream direction as indicated by an arrow 66 indicating the flow of cooling air through the combustor cooling air path 28. As a consequence, the angled passages 64 form eductor or ejector like formations in the rear shroud. When air is flowing in the combustor cooling air path 28 as will be the case during engine operation, the flow of such cooling air past the downstream sides 68 of the passages 64 will create a region of lower pressure relative to the outlet side of the diffuser 20 which will enhance the flow of cooling air through what may be termed a nozzle cooling air path including the inlet 60, the channel 58, the chamber 56, the openings 54 in the front shroud 50, the interior passages 62 within the blades or vanes 46 and the passages 64 in the rear shroud 42.

It will be observed that after conductive and convective cooling of the blades or vanes 46 from the interior thereof, such cooling air is joined with the cooling air that has cooled the combustor wall 30 and is discharged therewith into the combustor outlet 34 to mix with the hot gases of combustion and thus serve the purposes of dilution air. Consequently, a highly efficient cooling arrangement is provided.

In some instances, the trailing edge 70 of each of the blades or vanes 46 may be provided with a series of openings 72 to allow cooling air to exit the blades 46. When used, the openings 72 preferably are separated by so called pin fins shown somewhat schematically at 74 which aid in conductively cooling the trailing edge of the blades or vanes 46.

From the foregoing, it will be seen that the invention, through the use of an eductor-like configuration in the downstream side of the nozzle vanes 46, assures adequate air flow through such vanes so as to main cooling. In the usual case, flow of the cooling air through the nozzle components may be metered by appropriately sizing the openings 54 or the passages 64, or both. In a typical case, such will be sized so that approximately 2-3 percent of the compressed air output of the compressor 14 will enter the channel 58 for use in cooling the vanes.

In some instances, it may be desirable to locate swirler blades 78 between the combustor wall 30 and the rear engine shroud 42 at the point of the passages 64, that is, at their ends 68. The swirler vanes 78 are designed to impart circumferential swirl to the cooling air exiting the path 28 throughout the outlet 38 to promote good mixing with the gases of combustion at the combustor outlet 34. These vanes 78 will also tend to accelerate the cooling air moving in the path 28 which in turn will increase the eductor effect of the angled passages 64.

We claim:

1. A gas turbine comprising:
   a rotary compressor;
   a turbine wheel coupled to said compressor;
   a nozzle including a plurality of vanes for directing gases of combustion at said turbine wheel to drive the same;
   an annular combustor having an outlet connected to said nozzle and adapted to receive fuel and an oxidant therefor to provide gases of combustion;
   a combustor case generally surrounding said combustor in spaced relation thereto, said case having an upstream inlet connected to said compressor to receive compressed air therefrom and a downstream outlet adjacent said nozzle and said combustor outlet, and a combustor cooling air path interconnecting said inlet and said case outlet; and
   means defining a nozzle cooling air path including passages through said vanes, extending from said compressor to said combustor cooling air path to join the same at an intersection;
   said intersection being configured to educt cooling air thru said nozzle cooling air path in response to cooling air flowing through said combustor cooling air path.

2. The gas turbine of claim 1 wherein said turbine wheel is a radial turbine wheel and said nozzle surrounds said turbine wheel; and front and rear turbine shrouds for said turbine wheel with said vanes extending between said shrouds.

3. The gas turbine of claim 2 wherein said intersection includes passages in said rear shroud connected to said passages in said vanes and angled to open toward said case outlet.

4. The gas turbine of claim 3 wherein said shroud passages open toward said case outlet at a location just upstream and closely adjacent said case outlet.

5. The gas turbine of claim 1 wherein said vanes further include apertures connected to said passages and opening to the exterior of a corresponding vane for allowing the passage of cooling air therethrough.

6. The gas turbine of claim 2 wherein said nozzle cooling air path is connected to said compressor at about said case inlet and said intersection is at said rear shroud.

7. A gas turbine comprising:
a rotary compressor;
a radial wheel coupled to said compressor;
a nozzle including a plurality of vanes for directing gases of combustion at said turbine wheel to drive the same;
an annular combustor having an outlet connected to said nozzle and adapted to receive fuel and an oxidant therefor to provide gases of combustion;
a rear turbine shroud proximate to said turbine wheel;
means defining a combustor cooling air path about said combustor and having an inlet connected to said compressor and an outlet along said rear shroud;
means, including passages extending through said vanes, connected to said compressor to define a nozzle cooling air path through said nozzle to an outlet in said rear shroud; and
means associated with said nozzle cooling air path for creating a relatively lower presure area at said rear shroud outlet to promote the flow of cooling air through said nozzle cooling air path.

8. The gas turbine of claim 7 wherein said creating means includes eductor means operated in response to the flow of cooling air through said combustor cooling air path.

9. The gas turbine of claim 7 wherein said eductor means comprise eductor formations in said rear shroud.

10. The gas turbine of claim 9 wherein said eductor formations each comprise at least one passage in said rear shroud connected to both said cooling air paths and angled in the downstream direction at its point of connection to said combustor cooling air path.

11. The gas turbine of claim 10 wherein each said point of connection is at a location on said combustor cooling air path between said combustor and said rear shroud.

12. The gas turbine of claim 11 further including swirler vanes between said combustor and said rear shroud at said point of connection.

* * * * *